United States Patent
Matsuno

(10) Patent No.: US 12,459,374 B2
(45) Date of Patent: Nov. 4, 2025

(54) BRAKING AND DRIVING FORCE CONTROL APPARATUS

(71) Applicant: SUBARU CORPORATION, Tokyo (JP)

(72) Inventor: Koji Matsuno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 204 days.

(21) Appl. No.: 18/521,532

(22) Filed: Nov. 28, 2023

(65) Prior Publication Data

US 2024/0181895 A1    Jun. 6, 2024

(30) Foreign Application Priority Data

Dec. 5, 2022 (JP) ................. 2022-194124

(51) Int. Cl.
*B60L 15/20* (2006.01)
*B60K 17/354* (2006.01)
(Continued)

(52) U.S. Cl.
CPC ............. *B60L 15/2009* (2013.01); *B60L 7/26* (2013.01); *B60K 17/354* (2013.01);
(Continued)

(58) Field of Classification Search
CPC .... B60L 15/2009; B60L 7/26; B60L 2240/10; B60L 2240/18; B60L 2240/26; B60L 2240/42; B60L 2240/46; B60L 2240/64; B60L 2260/20; B60K 17/354; B60K 17/356

See application file for complete search history.

(56) References Cited

U.S. PATENT DOCUMENTS

| | | | |
|---|---|---|---|
| 11,077,835 B2 | 8/2021 | Maeda et al. | |
| 2005/0189163 A1* | 9/2005 | Barton | B60T 8/1764 180/446 |
| 2019/0299948 A1* | 10/2019 | Maeda | B60T 8/171 |

FOREIGN PATENT DOCUMENTS

| | | | |
|---|---|---|---|
| JP | 2003-136992 A | 5/2003 | |
| JP | 2007-308027 A | 11/2007 | |

(Continued)

*Primary Examiner* — Naeem Taslim Alam
(74) *Attorney, Agent, or Firm* — Rimon P.C.

(57) ABSTRACT

A braking and driving force control apparatus to be provided in a vehicle including front-wheel and rear-wheel longitudinal force generators that generate longitudinal forces of front and rear wheels, respectively. The braking and driving force control apparatus includes: first and second road surface friction coefficient setting units that respectively set first and second road surface friction coefficients; and a braking and driving force distribution control unit. The second road surface friction coefficient is larger than the first road surface friction coefficient. When the front-wheel and rear-wheel longitudinal force generators generate a driving force, the braking and driving force distribution control unit controls an output allotment ratio by using the first road surface friction coefficient. When the front-wheel and the rear-wheel longitudinal force generators generate a braking force, the braking and driving force distribution control unit controls the output allotment ratio by using the second road surface friction coefficient.

9 Claims, 5 Drawing Sheets

(51) Int. Cl.
    *B60K 17/356* (2006.01)
    *B60L 7/26* (2006.01)
(52) U.S. Cl.
    CPC ......... *B60K 17/356* (2013.01); *B60L 2240/10* (2013.01); *B60L 2240/18* (2013.01); *B60L 2240/26* (2013.01); *B60L 2240/42* (2013.01); *B60L 2240/46* (2013.01); *B60L 2240/64* (2013.01); *B60L 2260/20* (2013.01)

(56) References Cited

FOREIGN PATENT DOCUMENTS

| | | |
|---|---|---|
| JP | 2011-063105 A | 3/2011 |
| JP | 2019-172078 A | 10/2019 |

* cited by examiner

# BRAKING AND DRIVING FORCE CONTROL APPARATUS

CROSS-REFERENCE TO RELATED APPLICATIONS

The present application claims priority from Japanese Patent Application No. 2022-194124 filed on Dec. 5, 2022, the entire contents of which are hereby incorporated by reference.

BACKGROUND

The disclosure relates to a braking and driving force control apparatus that controls braking and driving forces of front wheels and rear wheels of a vehicle.

As to vehicles such as automobiles, there have been techniques related to, for example, estimation of a friction coefficient of a road surface, and a control based on a result of the estimation. For example, Japanese Unexamined Patent Application Publication (JP-A) No. 2019-172078 describes a vehicle control apparatus including a first road surface friction coefficient calculation unit, a second road surface friction coefficient calculation unit, and a braking and driving force control unit. The first road surface friction coefficient calculation unit calculates a first road surface friction coefficient that is a friction coefficient of a road surface with which wheels are in contact. The second road surface friction coefficient calculation unit calculates a second road surface friction coefficient based on a detection value from a non-contact sensor that detects a road surface state in a non-contact manner. The braking and driving force control unit normally controls braking and driving forces of a vehicle based on the first road surface friction coefficient. When it is determined based on the second road surface friction coefficient that a low friction road surface having a low friction coefficient is present ahead of the vehicle, the braking and driving force control unit controls the braking and driving forces of the vehicle based on the second road surface friction coefficient.

JP-A No. 2011-63105 describes a vehicle control apparatus that sets an upper limit and a lower limit of a road surface μ based on a longitudinal G and a lateral G of a subject vehicle or another vehicle. The vehicle control apparatus generates a driving plan and performs a vehicle control by calculating the road surface μ ranging downwardly from the upper limit or ranging upwardly from the lower limit.

JP-A No. 2007-308027 provides a description that a road surface friction coefficient is estimated based on self-aligning torque, and an upper limit value and a lower limit value of the road surface friction coefficient are set based on a grip margin.

JP-A No. 2003-136992 discloses a driving force distribution control apparatus for a four-wheel drive vehicle. The driving force distribution control apparatus includes a road surface friction coefficient estimation unit and a driving force distribution control unit. The road surface friction coefficient estimation unit estimates first data regarding a road surface friction coefficient of a road surface on which the vehicle is traveling, based on parameters including a wheel speed, a throttle plate position, and a speed. The driving force distribution control unit makes a variable control of a driving force distribution ratio between front and rear wheels. The driving force distribution control apparatus further includes an acquisition unit. The acquisition unit acquires second data regarding the road surface friction coefficient, from an electronic control apparatus that is provided in the four-wheel drive vehicle and is separate from the driving force distribution control apparatus. The driving force distribution control unit makes the variable control of the driving force distribution ratio based on the first data and the second data.

SUMMARY

An aspect of the disclosure provides a braking and driving force control apparatus to be provided in a vehicle. The vehicle includes a front-wheel longitudinal force generator and a rear-wheel longitudinal force generator. The front-wheel longitudinal force generator is configured to generate a longitudinal force of a front wheel, and the rear-wheel longitudinal force generator is configured to generate a longitudinal force of a rear wheel. The braking and driving force control apparatus includes a first road surface friction coefficient setting unit, a second road surface friction coefficient setting unit, and a braking and driving force distribution control unit. The first road surface friction coefficient setting unit is configured to set a first road surface friction coefficient. The second road surface friction coefficient setting unit is configured to set a second road surface friction coefficient larger than the first road surface friction coefficient. The braking and driving force distribution control unit is configured to control an output allotment ratio between the front-wheel longitudinal force generator and the rear-wheel longitudinal force generator by using the first road surface friction coefficient and the second road surface friction coefficient. The he braking and driving force distribution control unit is configured to, when the front-wheel longitudinal force generator and the rear-wheel longitudinal force generator generate a driving force as the longitudinal force, control the output allotment ratio by using the first road surface friction coefficient. The braking and driving force distribution control unit is configured to, when the front-wheel longitudinal force generator and the rear-wheel longitudinal force generator generate a braking force as the longitudinal force, control the output allotment ratio by using the second road surface friction coefficient.

An aspect of the disclosure provides a braking and driving force control apparatus to be provided in a vehicle. The vehicle includes a front-wheel longitudinal force generator and a rear-wheel longitudinal force generator. The front-wheel longitudinal force generator is configured to generate a longitudinal force of a front wheel, and the rear-wheel longitudinal force generator is configured to generate a longitudinal force of a rear wheel. The braking and driving force control apparatus includes circuitry configured to: set a first road surface friction coefficient; set a second road surface friction coefficient larger than the first road surface friction coefficient; and control an output allotment ratio between the front-wheel longitudinal force generator and the rear-wheel longitudinal force generator by using the first road surface friction coefficient and the second road surface friction coefficient. The circuitry is configured to, when the front-wheel longitudinal force generator and the rear-wheel longitudinal force generator generate a driving force as the longitudinal force, control the output allotment ratio by using the first road surface friction coefficient. The circuitry is configured to, when the front-wheel longitudinal force generator and the rear-wheel longitudinal force generator generate a braking force as the longitudinal force, control the output allotment ratio by using the second road surface friction coefficient.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
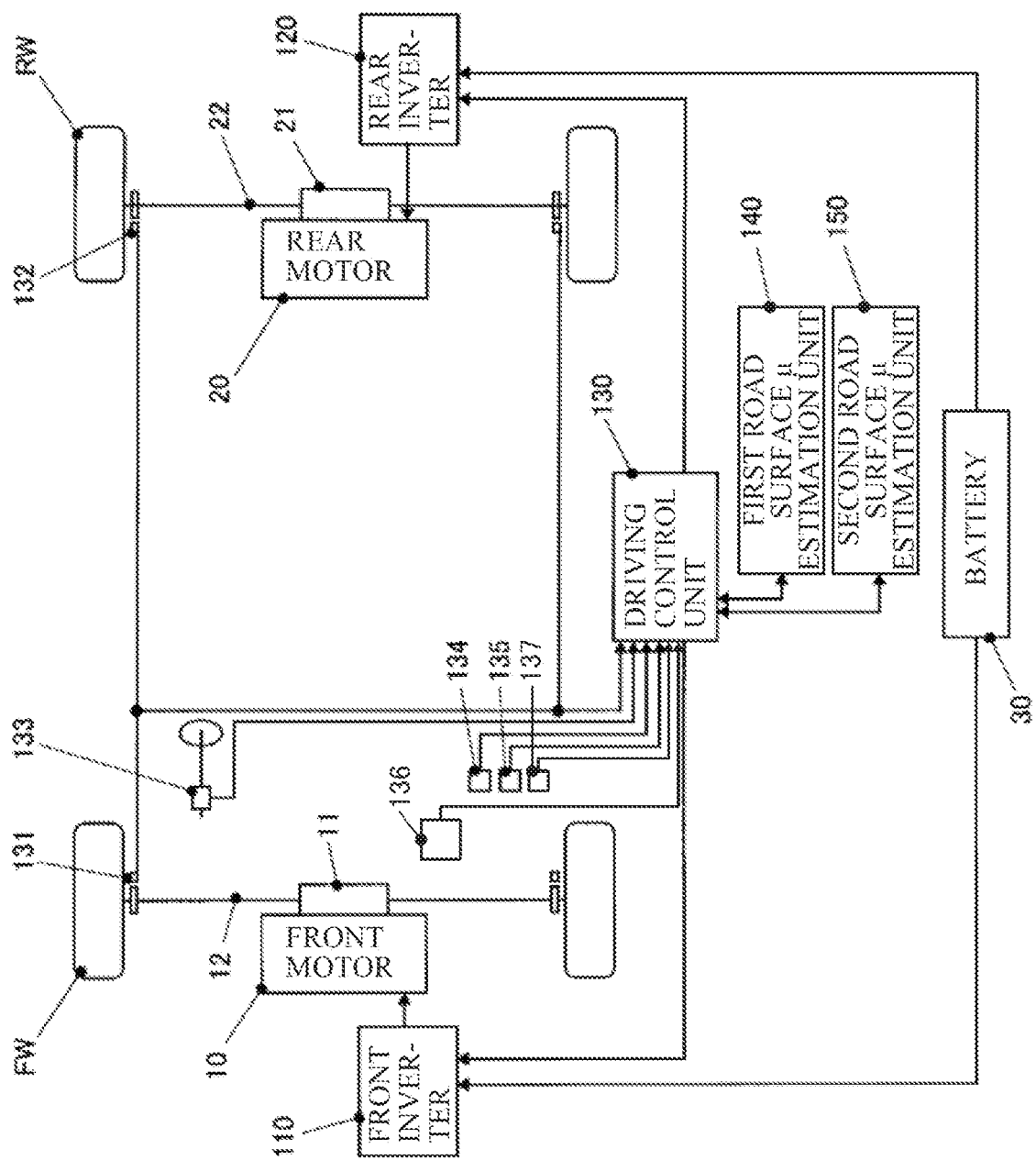
FIG. 1 is a schematic diagram of a configuration of a drivetrain of a vehicle including a braking and driving force control apparatus according to an embodiment of the disclosure.

Many methods of estimating a road surface friction coefficient have been known. For example, as described in JP-A No. 2003-136992, a proposal has been made for making a control by using multiple estimation values of a road surface friction coefficient.

However, the methods of estimating the road surface friction coefficient have different error ranges for each estimation principle, and it is difficult to integrate these into one estimation value. An error range includes upward fluctuation and downward fluctuation.

Moreover, when longitudinal distribution of a driving force or a regenerative force, i.e., a braking force, in a four-wheel drive vehicle is set based on an estimation result of the road surface friction coefficient, the upward fluctuation of the estimation value of the road surface friction coefficient in acceleration of the vehicle, i.e., in driving, may possibly cause an excessive driving force of rear wheels. This may cause a slip of the rear wheels, resulting in a concern about unstable behavior of the vehicle.

Similarly, the downward fluctuation of the estimation value of the road surface friction coefficient in deceleration of the vehicle, i.e., in regeneration, may possibly cause an excessive regenerative force of the rear wheels. This may cause the rear wheels to be locked, resulting in a concern about unstable behavior of the vehicle.

It is desirable to provide a braking and driving force control apparatus that makes it possible to provide adequate vehicle stability when a range of an assumed road surface friction coefficient varies.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Embodiment

Description is given below of a braking and driving force control apparatus according to a first embodiment of the disclosure.

The braking and driving force control apparatus according to the first embodiment may be provided in a vehicle, e.g., a passenger car. The vehicle may include, for example, motors for braking and driving, i.e., motor generators. The motors are independently provided for driving front wheels and driving rear wheels.

FIG. 1 schematically illustrates a configuration of a drivetrain of the vehicle including the braking and driving force control apparatus according to the first embodiment.

The vehicle 1 may be a four-wheel vehicle including a pair of right and left front wheels FW and a pair of right and left rear wheels RW.

The vehicle 1 may include, for example, a front motor 10, a rear motor 20, a battery 30, a front inverter 110, a rear inverter 120, a driving control unit 130, a first road surface μ estimation unit 140, and a second road surface μ estimation unit 150.

The front motor 10 may be a rotary electric machine configured to generate a driving force of the front wheels FW.

As the front motor 10, for example, a permanent magnet synchronous motor (PM motor) or an induction motor may be used.

The front motor 10 may serve as a motor generator configured to be supplied with electric power from the battery 30 to generate the driving force of the front wheels FW, and configured to perform regenerative power generation by torque transmitted from the front wheels FW to charge the battery 30.

In one embodiment of the disclosure, the front motor 10 may serve as a "front-wheel longitudinal force generator".

An output of the front motor 10 is transmitted to the front wheels FW through a front differential 11 and front drive shafts 12.

The front differential 11 may be a differential mechanism configured to transmit the output of the front motor 10 to the right and left front drive shafts 12, and configured to absorb differential rotation of the right and left front wheels FW caused by, for example, cornering.

The front drive shafts 12 may be rotary shafts configured to transmit the driving force from the front differential 11 to the right and left front wheels FW.

The front drive shafts 12 may include, for example, constant-velocity universal joints, to follow steering of the front wheels FW and strokes of front suspensions.

The rear motor 20 may be a rotary electric machine configured to generate a driving force of the rear wheels RW.

As the rear motor 20, for example, a permanent magnet synchronous motor or an induction motor may be used.

The rear motor 20 may serve as a motor generator configured to be supplied with electric power from the battery 30 to generate the driving force of the rear wheels RW, and configured to perform the regenerative power generation by torque transmitted from the rear wheels RW to charge the battery 30.

In one embodiment of the disclosure, the rear motor 20 may serve as a "rear-wheel longitudinal force generator".

An output of the rear motor 20 is transmitted to the rear wheels RW through a rear differential 21 and rear drive shafts 22.

The rear differential 21 may be a differential mechanism configured to transmit the output of the rear motor 20 to the right and left rear drive shafts 22, and configured to absorb differential rotation of the right and left rear wheels RW caused by, for example, cornering.

The rear drive shafts 22 may be rotary shafts configured to transmit the driving force from the rear differential 21 to the right and left rear wheels RW.

The rear drive shafts 22 may include, for example, constant-velocity universal joints, to follow strokes of rear suspensions.

The battery 30 may be a secondary battery configured to accumulate electric power to be used mainly for travel of the vehicle 1.

As the battery 30, for example, a lithium-ion battery may be used.

The front inverter 110 may convert a DC current supplied from the battery 30 into an AC current in response to a command from the driving control unit 130, and supply the AC current to the front motor 10 as electric power for driving.

The front inverter 110 may also serve as a regenerative inverter configured to convert an AC current supplied from the front motor 10 into a DC current and charge the battery 30 during the regenerative power generation by the front motor 10.

The rear inverter 120 may convert a DC current supplied from the battery 30 into an AC current in response to a command from the driving control unit 130, and supply the AC current to the rear motor 20 as electric power for driving.

The rear inverter 120 may also serve as a regenerative inverter configured to convert an AC current supplied from the rear motor 20 into a DC current and charge the battery 30 during the regenerative power generation by the rear motor 20.

The front inverter 110 and the rear inverter 120 may control output torque or absorbing torque of the front motor 10 and the rear motor 20 in accordance with a target driving force or a target braking force of the front wheels FW and the rear wheels RW commanded by the driving control unit 130.

The driving control unit 130 may give a command to the front inverter 110 and the rear inverter 120 in response to driver requested torque and control the outputs of the front motor 10 and the rear motor 20. The driver requested torque is set based on, for example, an accelerator operation by a driver.

Moreover, the driving control unit 130 may set a braking force allotment ratio between a regenerative power generation brake and a hydraulic brake in accordance with, for example, a brake operation by the driver.

At this occasion, the driving control unit 130 may give a command to the front inverter 110 and the rear inverter 120 in response to a braking request by the regenerative power generation brake, and allow the front motor 10 and the rear motor 20 to perform the regenerative power generation, thereby generating a braking force.

In one embodiment of the disclosure, the driving control unit 130 may serve as a "braking and driving force distribution control unit".

The driving control unit 130, the first road surface $\mu$ estimation unit 140, and the second road surface $\mu$ estimation unit 150 may include, for example, a microcomputer including a data processor such as a central processing unit (CPU), a storage such as a random access memory (RAM) and a read only memory (ROM), input and output interfaces, and a bus coupling them together.

The units may be communicatably coupled to one another either directly or through an on-board network such as a controller area network (CAN) communication system.

To the driving control unit 130, for example, vehicle speed sensors 131 and 132, a steering angle sensor 133, an acceleration rate sensor 134, and a yaw rate sensor 135 may be coupled.

The vehicle speed sensors 131 and 132 may be provided in hubs that rotatably support the front wheels FW and the rear wheels RW.

The vehicle speed sensors 131 and 132 may be provided on each of the right and left front wheels FW, and each of the right and left rear wheels RW.

The vehicle speed sensors 131 and 132 may output a vehicle speed signal corresponding to a rotation speed of each wheel.

The driving control unit 130 may calculate a wheel speed of each wheel in accordance with the vehicle speed signal.

The steering angle sensor 133 may be a sensor configured to detect a steering wheel angle $\theta H$. The steering wheel angle $\theta H$ is an angular position of a steering wheel with which an occupant or a driver makes a steering operation.

The driving control unit 130 is configured to calculate a steering angle of the front wheels FW based on the steering wheel angle $\theta H$ detected by the steering angle sensor 133 and a gear ratio n of an unillustrated steering gearbox. The gear ratio n is a constant.

The acceleration rate sensor 134 may be a sensor configured to detect a longitudinal acceleration rate and a lateral acceleration rate that act on a vehicle body. The lateral direction is a vehicle widthwise direction.

The yaw rate sensor 135 may be a sensor configured to detect a yaw rate. The yaw rate is a rotation speed around a vertical axis of the vehicle body.

In driving the front motor 10 and the rear motor 20, the driving control unit 130 may set output distribution between the motors. The output distribution between the motors is longitudinal distribution, i.e., an allotment ratio, of the driving force between the front wheels FW and the rear wheels RW.

In the regenerative power generation of the front motor 10 and the rear motor 20, the driving control unit 130 may set distribution of an amount of power generation between the motors. The distribution of the amount of power generation between the motors is longitudinal distribution of the braking force by the regenerative power generation brake between the front wheels FW and the rear wheels RW.

A control of these braking and driving forces is described in detail later.

The first road surface $\mu$ estimation unit 140 may estimate a friction coefficient $\mu$ of a road surface on which the vehicle 1 travels, based on tire forces generated by the front wheels FW and the rear wheels RW of the vehicle 1. In the following, the friction coefficient $\mu$ of the road surface on which the vehicle 1 travels is also referred to as a road surface $\mu$.

The first road surface μ estimation unit 140 may output an estimated road surface μ based on the lateral acceleration rate detected by the acceleration rate sensor 134 in a cornering state of the vehicle 1.

The cornering state of the vehicle 1 may be detected based on, for example, outputs of the steering angle sensor 133, the acceleration rate sensor 134, and the yaw rate sensor 135.

The first road surface μ estimation unit 140 may detect, for example, changes in the tire forces caused by the road surface μ. The first road surface μ estimation unit 140 may calculate the estimated road surface μ by the following Expression 1 in which the lateral acceleration rate is multiplied by a predetermined coefficient corresponding to a principle of the detection.

Estimated road surface μ=2×lateral acceleration rate (absolute value)/9.8 (Expression 1)

Here, the lateral acceleration rate of the vehicle body is a parameter correlated with the tire forces actually generated by the tires of the front wheels FW and the rear wheels RW.

The first road surface μ estimation unit 140 may estimate the road surface μ based on the tire forces of the front wheels FW and the rear wheels RW.

In one embodiment of the disclosure, the estimated road surface μ calculated by the first road surface μ estimation unit 140 may serve as a "first road surface friction coefficient".

In one embodiment of the disclosure, the first road surface μ estimation unit 140 may serve as a "first road surface friction coefficient setting unit".

The second road surface μ estimation unit 150 may detect luminance of the road surface optically, e.g., by using a camera. Based on the detected luminance, the second road surface μ estimation unit 150 may estimate, in a non-contact state, the road surface μ of the road surface on which the vehicle 1 travels.

The second road surface μ estimation unit 150 may include, for example, an imaging device such as a camera 136, an image processing device, and an outside air temperature sensor 137. The image processing device may perform image processing on captured images.

The second road surface μ estimation unit 150 may calculate average luminance of a pixel region corresponding to the road surface, from an image captured by the camera 136.

Moreover, the second road surface μ estimation unit 150 may detect presence or absence of moisture on the road surface, based on presence or absence of a local high luminance region caused by reflection of light, in the pixel region corresponding to the road surface.

In one embodiment of the disclosure, the camera 136 and the outside air temperature sensor 137 may serve as a "road surface property detector".

The second road surface μ estimation unit 150 may estimate, for example, a road surface condition and the road surface μ as summarized in Table 1 in accordance with the luminance of the road surface, an outside air temperature, and the presence or absence of moisture on the road surface.

TABLE 1

| Luminance of road surface | Outside air temperature ≈ road surface temperature | Moisture on road surface | Road surface condition | Estimated road surface μ |
|---|---|---|---|---|
| High luminance | 5° C. or higher | Not moist Moist | Dry Wet | 0.8 0.6 |

TABLE 1-continued

| Luminance of road surface | Outside air temperature ≈ road surface temperature | Moisture on road surface | Road surface condition | Estimated road surface μ |
|---|---|---|---|---|
| equal to or higher than threshold value | Below 5° C. | Not moist Moist | Dry Icy or snowy road | 0.8 0.3 |
| Low luminance below threshold value | 5° C. or higher Below 5° C. | Not moist Moist Not moist Moist | Dry Wet Dry Black ice | 0.8 0.6 0.8 0.1 |

The second road surface μ estimation unit 150 tends to overestimate the road surface μ, as compared with a value estimated by the first road surface μ estimation unit 140.

In one embodiment of the disclosure, the estimated road surface μ calculated by the second road surface μ estimation unit 150 may serve as a "second road surface friction coefficient".

In one embodiment of the disclosure, the second road surface μ estimation unit 150 may serve as a "second road surface friction coefficient setting unit".

The driving control unit 130 may control the output allotment ratio between the front motor 10 and the rear motor 20 by using the estimated road surface μ outputted by each of the first road surface μ estimation unit 140 and the second road surface μ estimation unit 150. The output allotment ratio means the longitudinal distribution of the driving force in driving, and the longitudinal distribution of the regenerative force in braking.

This point is described in detail later.

Figure 2:
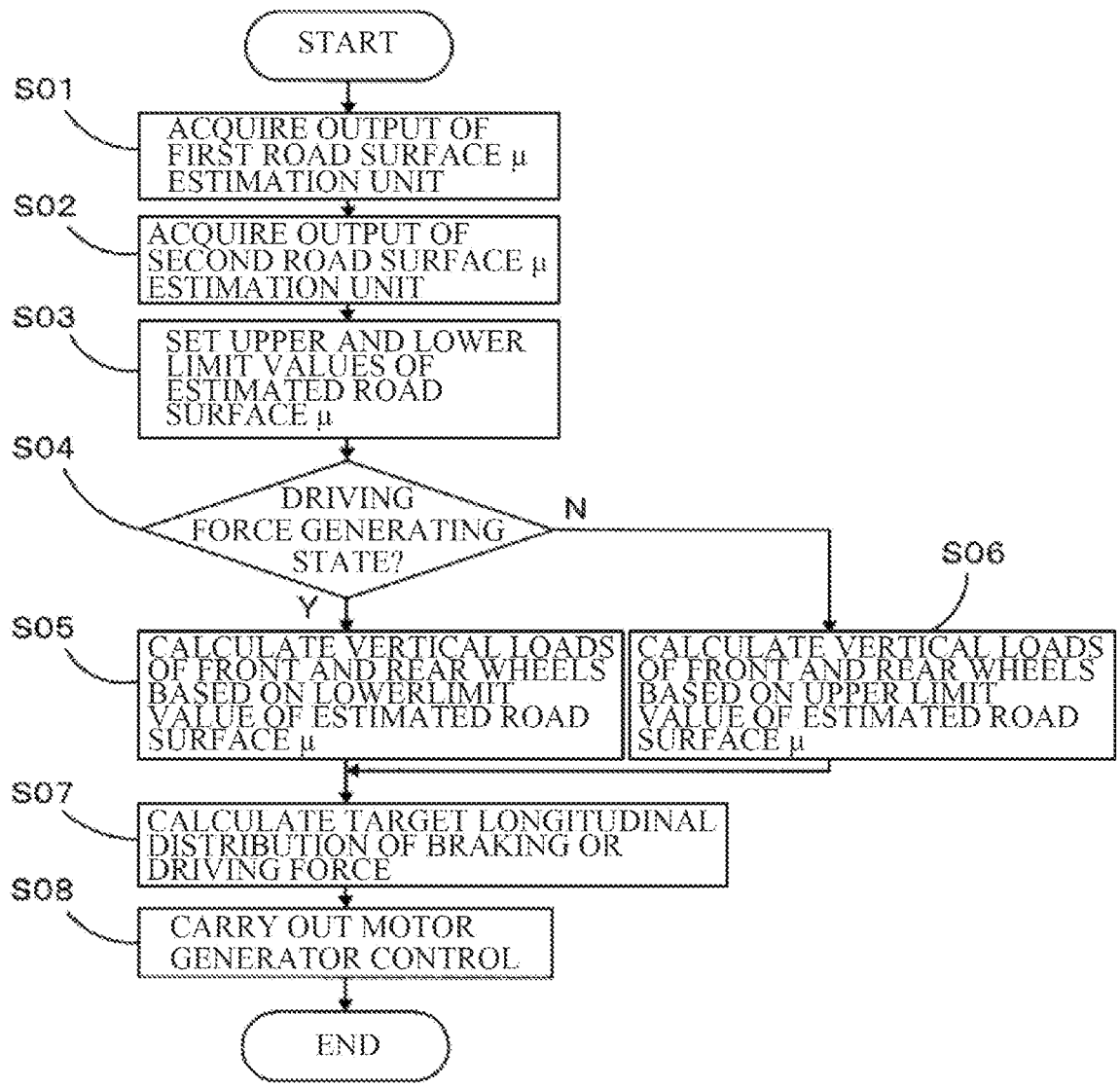
FIG. 2 is a flowchart illustrating an overview of a braking and driving force control in the braking and driving force control apparatus according to the embodiment.

FIG. 2 is a flowchart of an overview of a braking and driving force control in the braking and driving force control apparatus according to the first embodiment.

In the following, description is given in the order of steps.
<Step S01: Acquire Output of First Road Surface μ Estimation Unit>

The driving control unit 130 may acquire the estimated road surface μ estimated based on the tire forces, from the first road surface μ estimation unit 140.

Thereafter, the flow may be allowed to proceed to step S02.
<Step S02: Acquire Output of Second Road Surface μ Estimation Unit>

The driving control unit 130 may acquire the estimated road surface μ estimated based on the property of the road surface, from the second road surface μ estimation unit 150.

Thereafter, the flow may be allowed to proceed to step S03.
<Step S03: Set Upper Limit Value and Lower Limit Value of Estimated Road Surface μ>

The driving control unit 130 may set the estimated road surface μ acquired from the first road surface μ estimation unit 140, as a lower limit value of the estimated road surface μ.

Moreover, the driving control unit 130 may set the estimated road surface μ acquired from the second road surface μ estimation unit 150, as an upper limit value of the estimated road surface μ.

Thereafter, the flow may be allowed to proceed to step S04.
<Step S04: Determine Driving State and Braking State>

The driving control unit 130 may determine whether the front motor 10 and the rear motor 20 are in a driving force generating state, or whether the front motor 10 and the rear motor 20 are in a braking force generating state by the regenerative power generation.

When the motors are in the driving force generating state, the flow may be allowed to proceed to step S05. Otherwise, i.e., when the motors are in the braking force generating state, the flow may be allowed to proceed to step S06.

<Step S05: Calculate Vertical Loads of Front and Rear Wheels Based on Lower Limit Value of Estimated Road Surface μ>

The driving control unit 130 may calculate vertical loads of the front and rear wheels of the vehicle 1 based on the lower limit value of the estimated road surface μ set in step S03.

Figure 3:
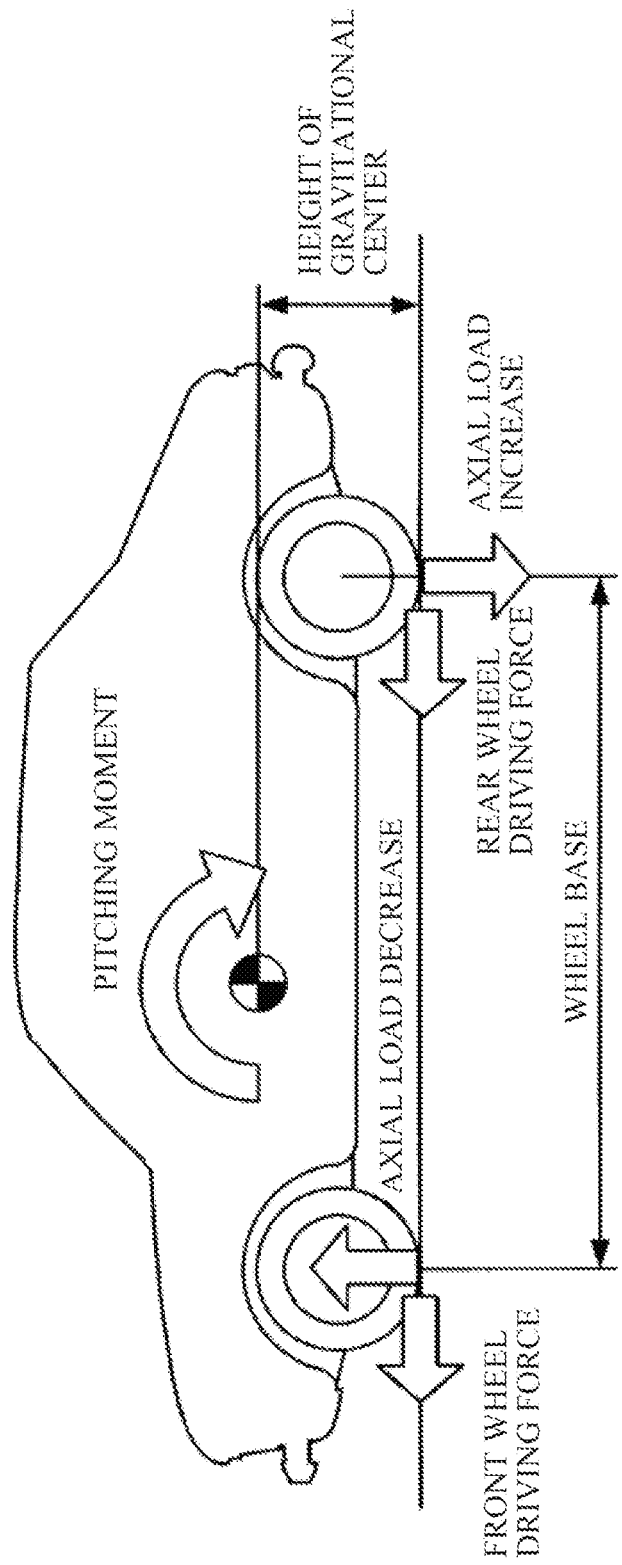
FIG. 3 is a diagram schematically illustrating a state in which a vehicle exhibits pitching behavior in a nose-up direction by acceleration.

FIG. 3 schematically illustrates a state in which a vehicle exhibits pitching behavior in a nose-up direction by acceleration.

The vertical loads of the front and rear wheels in consideration of a longitudinal load shift of the vehicle 1 are expressed by the following Expressions 2 and 3.

$$\begin{cases} F_{zf} = F_{zf0} - \Delta F_{zx} \\ F_{zr} = F_{zr0} + \Delta F_{zx} \end{cases} \quad \text{(Expressions 2 and 3)}$$

Fzf and Fzr: vertical loads of the front and rear wheels
Fzf0 and Fzr0: vertical loads of the front and rear wheels at rest
ΔFzx: amount of load shift caused by acceleration The amount of load shift caused by the acceleration mentioned above is expressed by the following Expression 4.

$$\Delta F_{zx} = \frac{m \cdot \ddot{x} \cdot h_g}{2 \cdot l} \quad \text{(Expression 4)}$$

m: vehicle mass
$\ddot{x}$: longitudinal acceleration rate
hg: height of the gravitational center
l: wheel base The longitudinal acceleration rate mentioned above is expressed by the following Expressions 5 and 6.

$$\ddot{x} = \begin{cases} \min \text{ (lower limit value of estimated road surface } \mu \times 9.8 \text{ motor maximum driving force/vehicle mass)} \ldots \text{ in acceleration or in driving} \\ -\min \text{ (upper limit value of estimated road surface } \mu \times 9.8 \text{ generator maximum regenerative force/vehicle mass)} \ldots \text{ in deceleration or in regeneration} \end{cases} \quad \text{(Expressions 5 and 6)}$$

After calculating the vertical loads of the front and rear wheels based on the lower limit of the estimated road surface μ, the flow may be allowed to proceed to step S07.

<Step S06: Calculate Vertical Loads of Front and Rear Wheels Based on Upper Limit Value of Estimated Road Surface μ>

Based on the upper limit value of the estimated road surface μ set in step S03, the driving control unit 130 may calculate the vertical loads of the front and rear wheels of the vehicle 1 by the same method as in step S05.

Thereafter, the flow may be allowed to proceed to step S07.

<Step S07: Calculate Target Longitudinal Distribution of Braking or Driving Force>

The driving control unit 130 may calculate target longitudinal distribution of the braking or driving force between the front motor 10 and the rear motor 20.

It is possible to calculate the target longitudinal distribution of the braking or driving force between the front motor 10 and the rear motor 20 with the use of, for example, an ideal distribution diagram of a driving force and a regenerative force described below.

Figure 4:
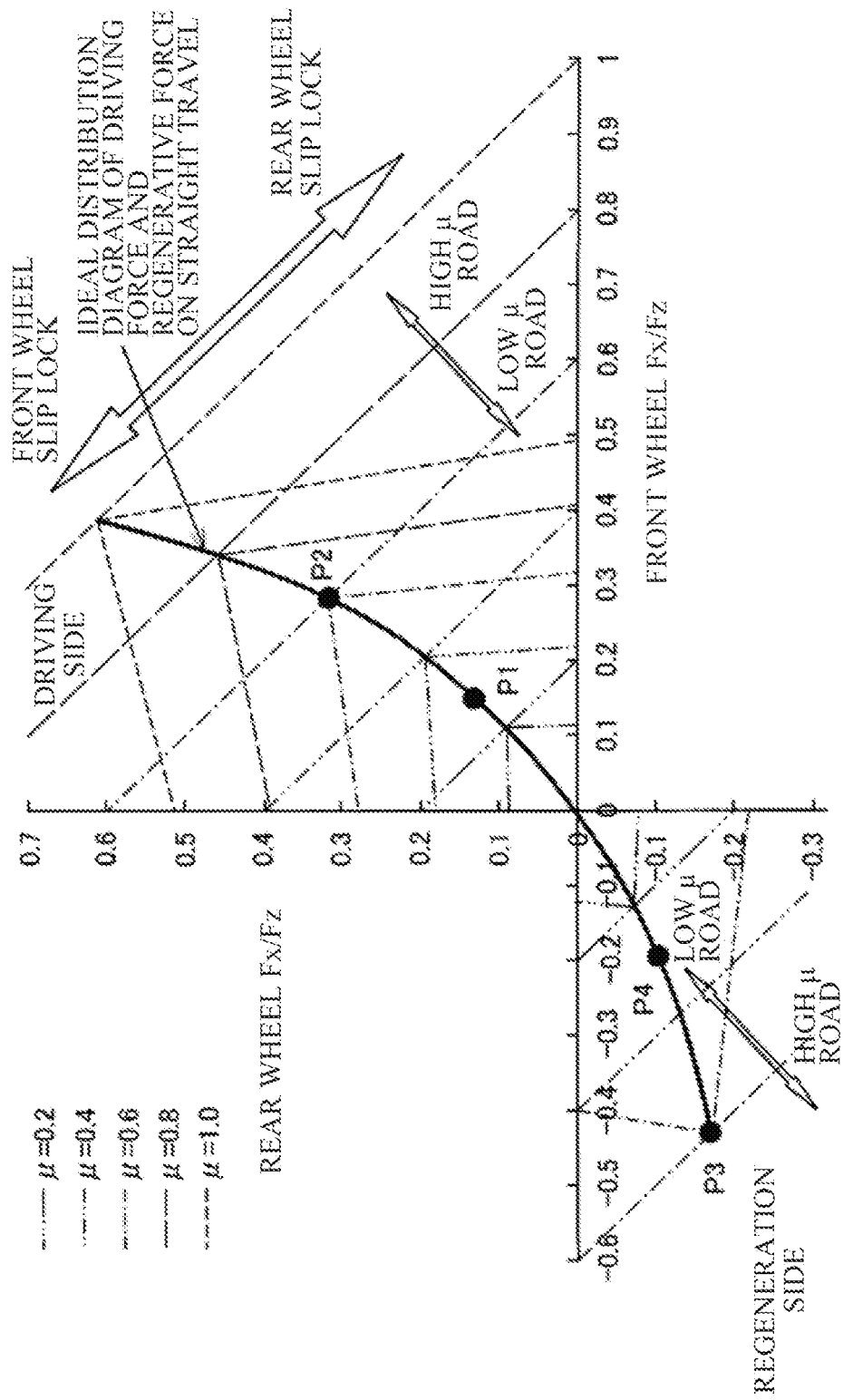
FIG. 4 is a diagram illustrating an example of an ideal distribution diagram of a driving force and a regenerative force of a vehicle.

FIG. 4 illustrates an example of an ideal distribution diagram of a driving force and a regenerative force of a vehicle.

In FIG. 4, the horizontal axis represents a value obtained by dividing a longitudinal force Fx of the front wheels by a vertical load Fz, and the vertical axis represents a value obtained by dividing a longitudinal force Fx of the rear wheels by a vertical load Fz. The longitudinal force is the driving force or the regenerative force.

The upper right region with respect to the origin indicates the driving side, and the lower left region indicates the braking side.

In the ideal distribution of the driving force and the regenerative force on straight travel illustrated in FIG. 4, the distribution of the driving force or the regenerative force is set to increase or decrease in accordance with the increase or the decrease in the vertical loads of the front wheels FW and the rear wheels RW, taking into consideration influences of a maximum longitudinal load shift to be possibly generated with the assumed road surface μ.

On the driving side, the longitudinal distribution of the driving force is set to be biased to the rear wheels in accordance with an increase in the assumed road surface μ. To be biased to the rear wheels means a tendency that the driving force of the rear wheels becomes relatively larger than the driving force of the front wheels.

On the braking side, the longitudinal distribution of the braking force, i.e., the regenerative force, is set to be biased to the front wheels in accordance with the increase in the assumed road surface μ. To be biased to the front wheels means a tendency that the braking force of the front wheels becomes relatively larger than the braking force of the rear wheels.

For example, the target longitudinal distribution, i.e., the distribution of the driving force or the regenerative force between the front wheels FW and the rear wheels RW, may be set to match the longitudinal distribution of the vertical loads Fzf: Fzr at the maximum driving force or the maximum braking force to be possibly generated with the relevant road surface μ.

After calculating the target longitudinal distribution of the braking or driving force, the flow may be allowed to proceed to step S08.

<Step S08: Carry Out Motor Generator Control>

The driving control unit 130 may control driving or the regeneration of the front motor 10 and the rear motor 20 with the use of the target longitudinal distribution of the braking and driving force calculated in step S07.

Thereafter, the series of processing may be ended.

In the following, effects of this embodiment are described.

Here, description is given of an example case where the lower limit value of the estimated road surface μ is 0.3 and the upper limit value of the estimated road surface μ is 0.6.

In a case where the driving force is set in accordance with the ideal distribution of the driving force illustrated in FIG. 4, when the vehicle 1 performs driving, with the estimated road surface μ being equal to, for example, 0.3 (estimated road surface μ=0.3), the longitudinal distribution of the driving force is set to 53:47 (point P1 on the diagram).

For example, with the estimated road surface μ being equal to, for example, 0.6 (estimated road surface μ=0.6), the longitudinal distribution of the driving force is set to 47:53 (point P2 on the diagram).

As described, when the vehicle 1 performs driving, if the estimated road surface μ is overestimated, the distribution of the driving force becomes more biased to the rear wheels than a case where the estimated road surface μ is underestimated. To be biased to the rear wheels means that the driving force of the rear wheels RW is relatively larger than that of the front wheels FW.

Thus, when the actual road surface μ is low, the driving force of the rear wheels becomes excessively large, causing a slip of the rear wheels, and resulting in a concern about unstable behavior of the vehicle 1.

Moreover, in a case where the regenerative force is set in accordance with the ideal distribution of the regenerative force illustrated in FIG. 4, when the vehicle 1 performs braking, i.e., the regenerative power generation, with the estimated road surface μ being equal to, for example, 0.6 (estimated road surface μ=0.6), the longitudinal distribution of the braking force, i.e., the regenerative force, is set to 71:29 (point P3 on the diagram).

For example, with the estimated road surface μ being equal to, for example, 0.3 (estimated road surface μ=0.3), the longitudinal distribution of the braking force is set to 65:35 (point P4 on the diagram).

As described, when the vehicle 1 performs braking, i.e., the regenerative power generation, if the estimated road surface μ is underestimated, the distribution of the braking force becomes more biased to the rear wheels than a case where the estimated road surface μ is overestimated. To be biased to the rear wheels means that the braking force of the rear wheels RW is relatively larger than that of the front wheels FW.

Thus, when the actual road surface μ is high, the braking force of the rear wheels RW becomes excessively large, causing the rear wheels to be locked, and resulting in a concern about unstable behavior of the vehicle 1.

In this regard, in the first embodiment, when the vehicle 1 performs driving, the longitudinal distribution of the driving force is controlled by using the lower limit value of the estimated road surface μ. The lower limit value is the estimated road surface μ outputted by the first road surface μ estimation unit 140. Hence, it is possible to suppress the driving force of the rear wheels from becoming excessively large, leading to suppression of the slip of the rear wheels RW and suppression of unstable behavior of the vehicle 1.

When the vehicle 1 performs braking, the longitudinal distribution of the braking force is controlled by using the upper limit value of the estimated road surface μ. The upper limit value is the estimated road surface μ outputted by the second road surface μ estimation unit 150. Hence, it is possible to suppress the braking force of the rear wheels RW from becoming excessively large, leading to suppression of the rear wheels RW from being locked, and suppression of unstable behavior of the vehicle 1.

Moreover, the driving control unit 130 may control the longitudinal distribution of the drive force and the braking force in accordance with the shift of the vertical loads of the front wheels FW and the rear wheels RW to be possibly generated with whichever of the first road surface friction coefficient and the second road surface friction coefficient is used in controlling the longitudinal distribution of the drive force and the braking force, i.e., the output allotment ratio between the front motor 10 and the rear motor 20. Hence, it is possible to appropriately control the output allotment ratio of the longitudinal force between the front wheels and the rear wheels, while taking into consideration the shift of the vertical loads of the front wheels FW and the rear wheels RW. The shift of the vertical loads of the front wheels FW and the rear wheels RW is closely related to limits of the tire forces together with the road surface friction coefficient.

Furthermore, the first road surface μ estimation unit 140 may estimate the road surface μ based on the tire forces generated by the tires of the front wheels FW and the rear wheels RW. The second road surface μ estimation unit 150 may estimate the road surface μ based on the property of the road surface such as the presence or absence of moisture and the outside air temperature. The outside air temperature is considered to be approximate to the road surface temperature. The road surface friction coefficient estimated based on the tire forces and the road surface friction coefficient estimated based on the property of the road surface may be set respectively as the lower limit value of the estimated road surface μ and the upper limit value of the estimated road surface μ. The road surface friction coefficient estimated based on the property of the road surface tends to be larger than the road surface friction coefficient estimated based on the tire forces. Hence, it is possible to appropriately obtain the effects described above.

In addition, the first road surface μ estimation unit 140 may estimate the road surface friction coefficient based on the lateral acceleration rate in cornering of the vehicle 1, while the second road surface μ estimation unit 150 may optically detect the property of the road surface. Hence, it is possible to set the lower limit value of the estimated road surface μ and the upper limit value of the estimated road surface μ, with a simple configuration.

Second Embodiment

Description is given next of a braking and driving force control apparatus according to a second embodiment of the disclosure.

In the second embodiment, the similar elements to those of the forgoing first embodiment are denoted by the same reference characters, and description thereof is omitted. Description is given mainly of differences.

Figure 5:
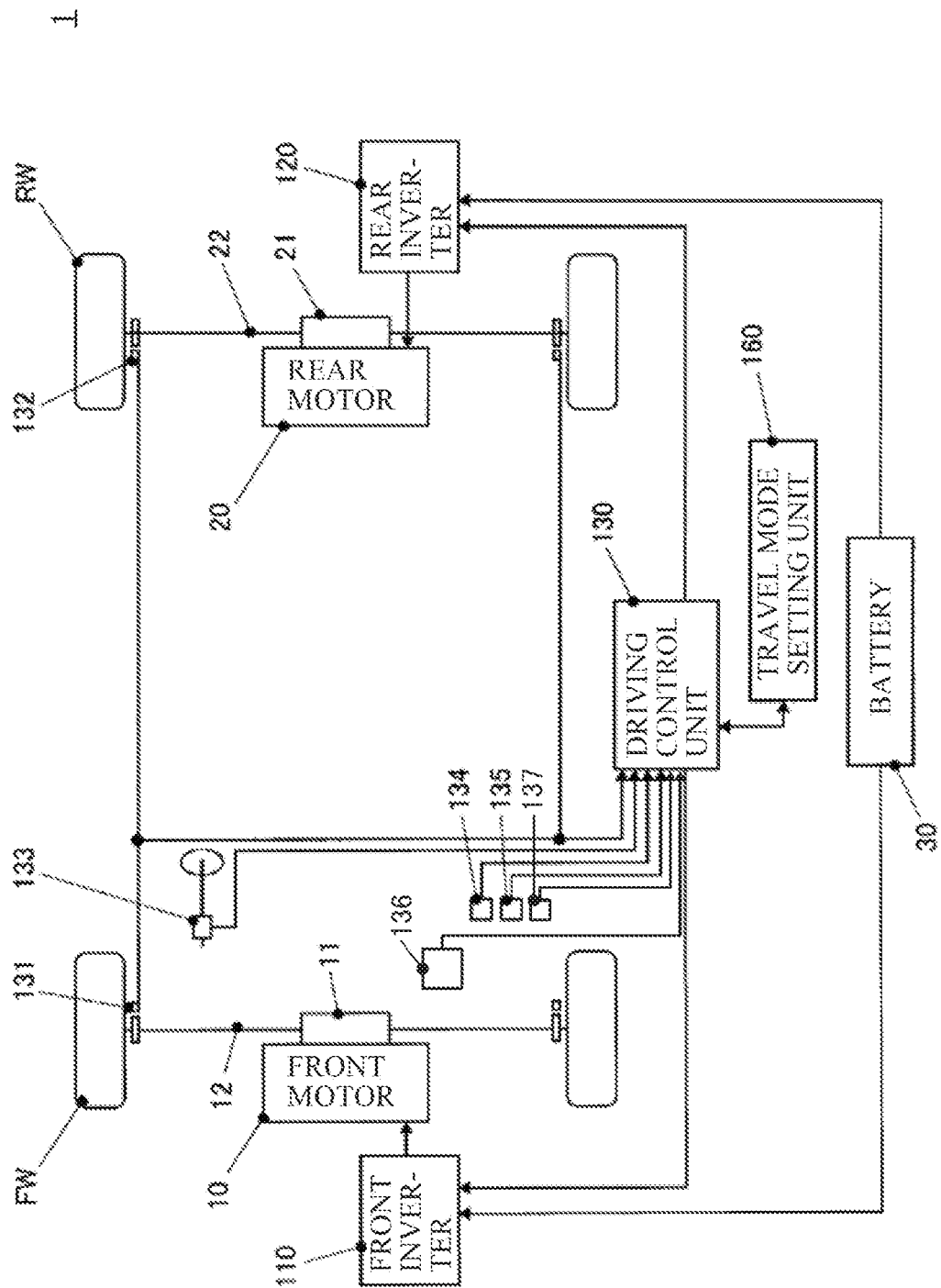
FIG. 5 is a schematic diagram of a configuration of a drivetrain of a vehicle including a braking and driving force control apparatus according to an embodiment of the disclosure.

FIG. 5 schematically illustrates a configuration of a drivetrain of a vehicle including the braking and driving force control apparatus according to the second embodiment.

In the second embodiment, instead of the first road surface μ estimation unit 140 and the second road surface μ estimation unit 150 of the first embodiment, a travel mode setting unit 160 described below is provided.

The travel mode setting unit 160 is configured to accept an operation of selecting one travel mode from multiple travel modes, and set the selected travel mode. The multiple travel modes differ in the assumed road surface μ.

The selection of the travel mode may be made by, for example, a user such as a driver with, for example, an unillustrated operation device such as a switch.

In the second embodiment, for example, three travel modes may be provided, as summarized in Table 2. In each of the travel modes, the upper limit values and the lower limit values of the road surface μ may be set, as summarized in Table 2.

TABLE 2

| Travel mode | Upper limit value of road surface μ | Lower limit value of road surface μ |
| --- | --- | --- |
| Tarmac, paved road | 1.0 | 0.8 |
| Gravel, unpaved road | 0.6 | 0.3 |
| Snow, snowy road | 0.3 | 0.1 |

In one embodiment of the disclosure, the travel mode setting unit 160 may serve as the "first road surface friction coefficient setting unit" and the "second road surface friction coefficient setting unit".

In the second embodiment, the driving control unit 130 may perform a longitudinal distribution control of the driving force and the braking force by using the lower limit value of the road surface μ and the upper limit value of the road surface μ in accordance with the travel mode set by the travel mode setting unit 160.

As described, in the second embodiment, as with the first embodiment, it is possible to suppress the driving force and the braking force of the rear wheels from becoming excessively large, leading to suppression of unstable behavior of the vehicle. It is also possible to provide setting of the first and second road surface friction coefficients reflecting the intention of the user, typically, the driver, with a simple configuration.

Moreover, hardware and logic for estimating the road surface friction coefficient become unnecessary, leading to a simple apparatus configuration.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) The configurations of the braking and driving force control apparatus and the vehicle are not limited to the forgoing embodiments, but may be changed as appropriate.

(2) In the first embodiment, the method of estimating the road surface friction coefficient is merely an example, and may be changed as appropriate.

For example, the road surface friction coefficient based on the tire forces may be estimated based on, for example, self-aligning torque of the steering device, instead of the lateral acceleration rate acting on the vehicle body on the occasion of cornering.

Moreover, the property of the road surface such as the wet state may be acquired in a non-contact manner, e.g., acoustically, from a traveling sound of the vehicle, in place of the optical method or together with the optical method.

(3) In the second embodiment, the setting of the upper limit value and the lower limit value of the road surface friction coefficient in accordance with the selection of the travel mode is merely an example, and may be changed as appropriate.

For example, the number of the selectable travel modes, the upper limit value and the lower limit value of the road surface friction coefficient to be set in each travel mode may be changed as appropriate.

As described, according to the disclosure, in acceleration of the vehicle, i.e., in driving, the output allotment ratio between the front-wheel longitudinal force generator and the rear-wheel longitudinal force generator, i.e., a driving force allotment ratio, is controlled by using the first road surface friction coefficient. The first road surface friction coefficient is smaller than the second road surface friction coefficient. Hence, it is possible to suppress the driving force of the rear wheels from becoming excessively large, and suppress a slip of the rear wheels. This leads to suppression of unstable behavior of the vehicle.

In deceleration of the vehicle, i.e., in regeneration, the output allotment ratio between the front-wheel longitudinal force generator and the rear-wheel longitudinal force generator, i.e., a braking force allotment ratio by the regeneration, is controlled by using the second road surface friction coefficient. The second road surface friction coefficient is larger than the first road surface friction coefficient. Hence, it is possible to suppress the braking force of the rear wheels from becoming excessively large, and suppress the rear wheels from being locked. This leads to suppression of unstable behavior of the vehicle.

As described, according to the disclosure, it is possible to provide a braking and driving force control apparatus that makes it possible to provide adequate vehicle stability when a range of an assumed road surface friction coefficient varies.

The driving control unit 130, the first road surface μ estimation unit 140, the second road surface μ estimation unit 150, and the travel mode setting unit 160 illustrated in FIGS. 1 and 5 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving control unit 130, the first road surface μ estimation unit 140, the second road surface μ estimation unit 150, and the travel mode setting unit 160. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving control unit 130, the first road surface u estimation unit 140, the second road surface μ estimation unit 150, and the travel mode setting unit 160 illustrated in FIGS. 1 and 5.

The invention claimed is:

1. A braking and driving force control apparatus to be provided in a vehicle, the vehicle including a front-wheel longitudinal force generator and a rear-wheel longitudinal force generator, the front-wheel longitudinal force generator being configured to generate a longitudinal force of a front wheel, and the rear-wheel longitudinal force generator being configured to generate a longitudinal force of a rear wheel, the braking and driving force control apparatus comprising:
   a first road surface friction coefficient setting unit configured to set a first road surface friction coefficient;

a second road surface friction coefficient setting unit configured to set a second road surface friction coefficient larger than the first road surface friction coefficient; and a braking and driving force distribution control unit configured to control an output allotment ratio between the front-wheel longitudinal force generator and the rear-wheel longitudinal force generator by using the first road surface friction coefficient and the second road surface friction coefficient, wherein the braking and driving force distribution control unit is configured to, when the front-wheel longitudinal force generator and the rear-wheel longitudinal force generator generate a driving force, control the output allotment ratio by using the first road surface friction coefficient, and the braking and driving force distribution control unit is configured to, when the front-wheel longitudinal force generator and the rear-wheel longitudinal force generator generate a braking force, control the output allotment ratio by using the second road surface friction coefficient.

2. The braking and driving force control apparatus according to claim 1, wherein the braking and driving force distribution control unit is configured to control the output allotment ratio in accordance with a shift of vertical loads of the front wheel and the rear wheel to be generated with whichever of the first road surface friction coefficient and the second road surface friction coefficient is used in controlling the output allotment ratio.

3. The braking and driving force control apparatus according to claim 1, wherein the first road surface friction coefficient setting unit is configured to set, as the first road surface friction coefficient, a road surface friction coefficient estimated based on a tire force generated by one or both of the front wheel and the rear wheel, the second road surface friction coefficient setting unit includes a road surface property detector configured to detect a property of a road surface, and the second road surface friction coefficient setting unit is configured to set, as the second road surface friction coefficient, a road surface friction coefficient estimated based on the detected property of the road surface.

4. The braking and driving force control apparatus according to claim 2, wherein the first road surface friction coefficient setting unit is configured to set, as the first road surface friction coefficient, a road surface friction coefficient estimated based on a tire force generated by one or both of the front wheel and the rear wheel, the second road surface friction coefficient setting unit includes a road surface property detector configured to detect a property of a road surface, and the second road surface friction coefficient setting unit is configured to set, as the second road surface friction coefficient, a road surface friction coefficient estimated based on the detected property of the road surface.

5. The braking and driving force control apparatus according to claim 3, wherein the first road surface friction coefficient setting unit is configured to estimate the road surface friction coefficient based on a lateral acceleration rate in cornering of the vehicle, and the road surface property detector of the second road surface friction coefficient setting unit is configured to detect the property of the road surface optically, acoustically, or both.

6. The braking and driving force control apparatus according to claim 4, wherein the first road surface friction coefficient setting unit is configured to estimate the road surface friction coefficient based on a lateral acceleration rate in cornering of the vehicle, and the road surface property detector of the second road surface friction coefficient setting unit is configured to detect the property of the road surface optically, acoustically, or both.

7. The braking and driving force control apparatus according to claim 1, further comprising a travel mode setting unit configured to accept an operation of selecting one travel mode from multiple travel modes and set the selected travel mode, wherein the first road surface friction coefficient setting unit and the second road surface friction coefficient setting unit are configured to set predetermined friction coefficients, as the first road surface friction coefficient and the second road surface friction coefficient, in accordance with the selected travel mode.

8. The braking and driving force control apparatus according to claim 2, further comprising a travel mode setting unit configured to accept an operation of selecting one travel mode from multiple travel modes and set the selected travel mode, wherein the first road surface friction coefficient setting unit and the second road surface friction coefficient setting unit are configured to set predetermined friction coefficients, as the first road surface friction coefficient and the second road surface friction coefficient, in accordance with the selected travel mode.

9. A braking and driving force control apparatus to be provided in a vehicle, the vehicle including a front-wheel longitudinal force generator and a rear-wheel longitudinal force generator, the front-wheel longitudinal force generator being configured to generate a longitudinal force of a front wheel, and the rear-wheel longitudinal force generator being configured to generate a longitudinal force of a rear wheel, the braking and driving force control apparatus comprising circuitry configured to:

set a first road surface friction coefficient;

set a second road surface friction coefficient larger than the first road surface friction coefficient; and control an output allotment ratio between the front-wheel longitudinal force generator and the rear-wheel longitudinal force generator by using the first road surface friction coefficient and the second road surface friction coefficient, wherein the circuitry is configured to, when the front-wheel longitudinal force generator and the rear-wheel longitudinal force generator generate a driving force, control the output allotment ratio by using the first road surface friction coefficient, and the circuitry is configured to, when the front-wheel longitudinal force generator and the rear-wheel longitudinal force generator generate a braking force, control the output allotment ratio by using the second road surface friction coefficient.

* * * * *